Sept. 10, 1946.   A. H. BENNETT   2,407,219
OPTICAL SYSTEM
Filed Dec. 2, 1943
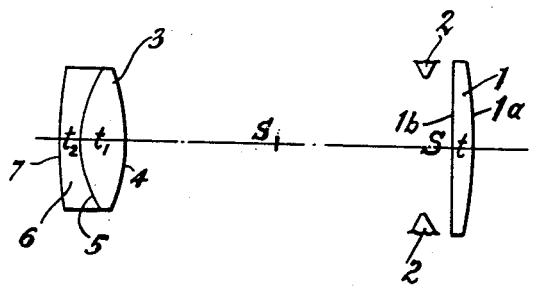
INVENTOR.
ALVA H. BENNETT.
BY Raymond A. Paquin
ATTORNEY

UNITED STATES PATENT OFFICE 2,407,219

OPTICAL SYSTEM

Alva H. Bennett, Kenmore, N. Y., assignor by mesne assignments, to American Optical Company, Southbridge, Mass., a voluntary association Application December 2, 1943, Serial No. 512,569

5 Claims. (Cl. 88—57)

This invention relates to optical systems and more particularly to a new and improved optical system for use as a projection ocular for a microprojector or the like.

An object of the invention is to provide an optical system of the type set forth which is well corrected for curvature of field, distortion and lateral color.

Another object of the invention is to provide a series of projection oculars for use with a microprojector or the like.

Other objects and advantages of the invention will be apparent from the following description taken in connection with the accompanying drawing. It will be understood that many changes may be made in the details of construction and arrangement of parts without departing from the spirit of the invention as expressed in the accompanying claims. I, therefore, do not wish to be limited to the exact details of construction and arrangement of parts shown and described as the preferred form has been shown by way of illustration only.

Referring to the drawing, the single figure shows a sectional view of a lens system constructed according to the invention.

The lens system has been basically designed for a system having a 10X magnification.

A lens system having a magnification of 10X has been designed as the basis for the system. However, the system may be ratioed for other magnifications such as for 3X, 5X, 7.5X and 16X magnifications for which magnifications the designs are also given in addition to the basic 10X system.

As stated above the system having a 10X magnification has been the basis for all of the systems and the other systems are all approximate ratios of that system with such small variations from the ratioed value as are necessary to avoid incorrect lens thicknesses and to correct for the entrance pupil distance. This distance has not been ratioed for each system but has been kept constant because the tube connecting the ocular embodying the system, and the objective is of fixed length. The entrance pupil is in the near vicinity of the objective.

In this system the variable focusing of the eye lens is necessary to keep the field diaphragm in focus as the throw is changed.

Referring more particularly to the drawing the ocular comprises the field lens $1$, having the surfaces $1a$ and $1b$, the field diaphragm $2$ and the cemented doublet eye lens which is composed of the lens element $3$ having the surfaces $4$ and $5$ and the lens element $6$ having the surfaces $5$ and $7$.

The field lens $1$ is formed of a spectacle crown glass having an index of refraction of approximately 1.52 and an Abbe number of approximately 58.5.

The lens element $3$ is of a crown glass having an index of refraction of approximately 1.51 and an Abbe number of approximately 59.5. The lens element $6$ is of a dense flint glass having an index of refraction of approximately 1.64 and an Abbe number of approximately 33.8.

The above glasses are the same for all magnifications.

The following are the approximate radii of curvature, thickness and separation for each magnification.

The radius of curvature of the surface $1a$ for a 10X magnification is $+37.585$ mm.; for a 3X magnification $+125.284$ mm.; for a 5X magnification $+75.169$ mm.; for a 7.5X magnification $+50.113$ mm.; and for a 16X magnification this surface is plano.

The radius of curvature of the surface $1b$ for the 3X, 5X, 7.5X and 10X magnifications, that is, all but the 16X magnification is plano. For the 16X magnification the direction of the element $1$ is reversed and the radius of the surface $1b$ is $-23.49$ mm.

The axial thickness $t$ of the lens $1$ for all magnifications given is 2 mm.

The axial separation $S$ of the field lens $1$ and the field diaphragm $2$ is 1.75 mm. for the 10X magnification; 8.91 mm. for the 3X magnification; 4.82 mm. for the 5X magnification; 2.77 mm. for the 7.5X magnification and 1.91 mm. for the 16X magnification.

The axial separation $S_1$ between the field lens $1$ and lens element $3$ may be varied within certain limits without deteriorating the image. For the 3X magnification the separation must be between 86.5 mm. and 106. mm. For the 5X magnification the sepraation must be between 51. mm. and 63.25 mm. For the 7.5X magnification the separation must be between 33.10 mm. and 45.30 mm.

For the 10X magnification the separation must be between 23.8 mm. and 36.05 mm., and for the 16X magnification the separation must be between 15.1 mm. and 20. mm.

The radius of curvature of the surface $4$ for the 10X magnification is $+14.41$ mm.; for the 3X magnification $+48.3$ mm.; for the 5X magnification $+29.$ mm.; for the 7.5X magnification +19.2 mm. and for the 16X magnification +9. mm.

The thickness $t_1$ of the lens element 3 for the 10X magnification is 4.6 mm.; for the 3X magnification 3.55 mm.; for the 5X magnification 4. mm.; for the 7.5X magnification 4.41 mm., and for the 16X magnification 4.1 mm.

The radius of curvature of the surfaces 5 or the lens elements 3 and 6 are −9.5 mm. for the 10X magnification; −27.5 mm. for the 3X magnification; −17.8 mm. for the 5X magnification; −12.7 mm. for the 7.5X magnification, and −5.8 mm. for the 16X magnification.

The axial thickness $t_2$ of the lens element 6 for the 10X magnification, 5X magnification and 7.5X magnification is 2. mm.; for the 3X magnification 2.5 mm. and for the 16X magnification 1.5 mm.

The radius of curvature of the surface 7 of the lens element 6 is −30.89 mm. for the 10X magnification; −97.15 mm. for the 3X magnification; −60.76 mm. for the 5X magnification; −42.16 mm. for 7.5X magnification and −18.52 mm. for the 16X magnification.

In designing the above system it is necessary to investigate the effect of the choice of first order system on the resulting aberrations. The two parameters available in the first order system are the ratio of the powers of the eye lens and the field lens and their separation. A suitable arbitrary first order system is chosen and this is corrected to the third order for lateral color and primary curvature and the distortion is evaluated. This is repeated for the change of separation and change of power ratio of the eye lens to the field lens. By means of suitable contour graphs the best first order system is selected.

As stated above, the fields lens is reversed in the 16X magnification to avoid having the surface of this lens too near the focal plane of the eye lens so that dirt and scratches on this lens will be out of focus in the projected image and will not be noticeable or conspicuous.

From the above values it will be noted that the focal length of the field lens is approximately 2.9 times the focal length of the eyepiece, the focal length of the eye lens is approximately .96 times the focal length of the eyepiece and the separation of the field lens and eye lens approximately 1.1 to 1.2 times the focal length of the eyepiece.

It is also pointed out that the focal plane or primary image plane falls between the field lens and eye lens.

From the foregoing it will be seen that I have provided simple, efficient and economical means for obtaining all of the objects and advantages of the invention.

Having described my invention, I claim:

1. An optical system for use as a projection ocular and corrected for distortion and lateral color comprising a singlet front lens and a doublet rear component, the focal plane of the system falling between the singlet front lens and the doublet rear component, the said system being corrected for curvature of field, distortion and lateral color, the said front lens being of a transparent lens medium having an index of refraction of approximately 1.52 and an Abbe number of approximately 58.5, the doublet rear component consisting of a front element being of transparent lens medium having an index of refraction of approximately 1.51 and an Abbe number of approximately 59.5 and the rear element of said doublet being of transparent lens medium having an index of refraction of approximately 1.64 and an Abbe number of approximately 33.8 and the axial separation between the front singlet lens and the doublet rear component being between 23.8 mm. and 36.05 mm. and the radii of curvature of the surfaces of the singlet front element being approximately +37.5 mm. and plano and the radii of curvature of the front element of the rear doublet being approximately +14.41 mm. and −9.5 mm. respectively and the radii of curvature of the rear element of said doublet being approximately −9.5 mm. and −30.89 mm. respectively for a system having a magnification of 10X and the radii of curvature of the surfaces of the elements being substantially ratioed from the above values for systems having other magnifications.

2. In a projection eyepiece for use as a projection ocular, an optical system comprising a singlet plano-convex field lens and a doublet eye lens, the primary image plane of said eyepiece falling between said field lens and said eye lens, the first order characteristics of the system being determined by a ratio between the focal length of said field lens and the focal length of said eyepiece of approximately 2.9 to 1, and a ratio between the focal length of said eye lens and the focal length of said eyepiece of approximately 0.96 to 1.

3. In a projection eyepiece for use as a projection ocular, an optical system comprising a singlet field lens and a doublet eye lens, the primary image plane of said eyepiece falling between said field lens and said eye lens, the first order characteristics of the system being determined by the ratio between the focal length of said field lens and the focal length of said eyepiece of approximately 2.9 to 1, a ratio between the focal length of said eye lens and the focal length of said eyepiece of approximately 0.96 to 1 and the separation between the field lens and the eye lens approximately 1.1 to 1.2 times the focal length of the eyepiece.

4. In a projection eyepiece for use as a projection ocular, an optical system comprising a singlet field lens and an eye lens, the primary image plane of said eyepiece falling between said field lens and said eye lens, the first order characteristics of the system being determined by a ratio between the focal length of said field lens and the focal length of said eyepiece of approximately 2.9 to 1, and a ratio between the focal length of said eye lens and the focal length of said eyepiece of approximately 0.96 to 1, said eye lens being a cemented doublet composed of a flint element having an index of refraction of approximately 1.64 and an Abbe number of approximately 33.8 and a crown element having an index of refraction of approximately 1.51 and an Abbe number of approximately 59.5, said optical system comprising said singlet being essentially free from curvature of field while maintaining satisfactory corrections of distortion and lateral color.

5. In a projection eyepiece for use as a projection ocular, an optical system as set forth in claim 4 in which the separation between said field lens and said eye lens is approximately 1.1 to 1.2 times the focal length of said eyepiece.

ALVA H. BENNETT.